INVENTOR
MARVIN J. FORAL
BY
ATTORNEY

INVENTOR.
MARVIN J. FORAL
BY Henry Hansen
ATTORNEY

Feb. 13, 1968  M. J. FORAL  3,369,231

AIRBORNE OBSTACLE AVOIDANCE SYSTEM

Filed Aug. 26, 1964  6 Sheets-Sheet 4

*INVENTOR.*
MARVIN J. FORAL

BY
ATTORNEY

Feb. 13, 1968 M. J. FORAL 3,369,231
AIRBORNE OBSTACLE AVOIDANCE SYSTEM
Filed Aug. 26, 1964 6 Sheets-Sheet 5

INVENTOR.
MARVIN J. FORAL
BY
ATTORNEY

Fig. 8

United States Patent Office 3,369,231
Patented Feb. 13, 1968

3,369,231
AIRBORNE OBSTACLE AVOIDANCE SYSTEM
Marvin J. Foral, Doylestown, Pa., assignor to the United States of America as represented by the Secretary of the Navy
Filed Aug. 26, 1964, Ser. No. 392,358
11 Claims. (Cl. 343—7.9)

The invention described herein may be manufactured and used by or for the Government of the United States of America for governmental purposes without the payment of any royalties thereon or therefor.

The present invention relates to radar systems, and more particularly to an airborne obstacle avoidance system which detects and displays the azimuth, elevation and range of remote objects in front of a moving aircraft.

The need for obstacle avoidance radar systems in aircraft has been intensified with the increasing use of high speed aircraft on military missions which require flying at extremely low altitudes. In some radar systems in use today, up to three separate displays are needed to present the radar information thereby making correlation of azimuth, elevation and range by the pilot extremely difficult. In other systems, radar information processing is either too slow or inaccurate, or they are unable to display small objects in a real world background to the pilot. That is, heretofore existing systems do not display the type of information required for low-altitude, high-speed terrain following, nor do they clearly show on a single display the range, azimuth and elevation of small obstacles in a real world background of the contoured terrain.

Accordingly, it is an object of the present invention to provide an obstacle avoidance radar system which is particularly suitable for use with high speed aircraft at low altitudes in which terrain is clearly indicated as a quasi-real world background on a single display in accordance with azimuth, elevation and range, and in which relatively small objects are accentuated in the real world background.

Another object of the invention is to provide an airborne obstacle avoidance radar system in which the highest elevation of terrain or small objects within predetermined range zones are displayed in distinct colors.

Still another object of the invention is to provide a quasi-real world display of terrain clearance in an airborne vehicle for any altitude and flight path.

A still further object of the invention is to provide an obstacle avoidance system having a high degree of resolution over a wide field of view in front of the aircraft, which utilizes circuits and components particularly suited for an aircraft environment, which is relatively simple and inexpensive to manufacture, which is accurate and reliable, which is simple to manufacture and maintain, and which meets military specifications.

The foregoing objects of the invention, and other objects which will become apparent as the description proceeds, are achieved in the illustrated embodiment by the provision in combination of an airborne radar which transmits short radar pulses in a pencil-like beam from a vertical and horizontal scanning antenna, a multi-color cathode ray tube displays the return signals at positions coordinated with the antenna position, a video processor controls the color on the cathode ray tube as a function of range, and a range adjuster compensates for aircraft altitude and antenna depression angle, thereby producing a quasi-real world display of the highest elevations viewed by the scanning antenna for a plurality of range zones at different colors.

For a more complete and better understanding of the invention reference will now be made to the accompanying drawing wherein.

Figures 1, 11, 12:
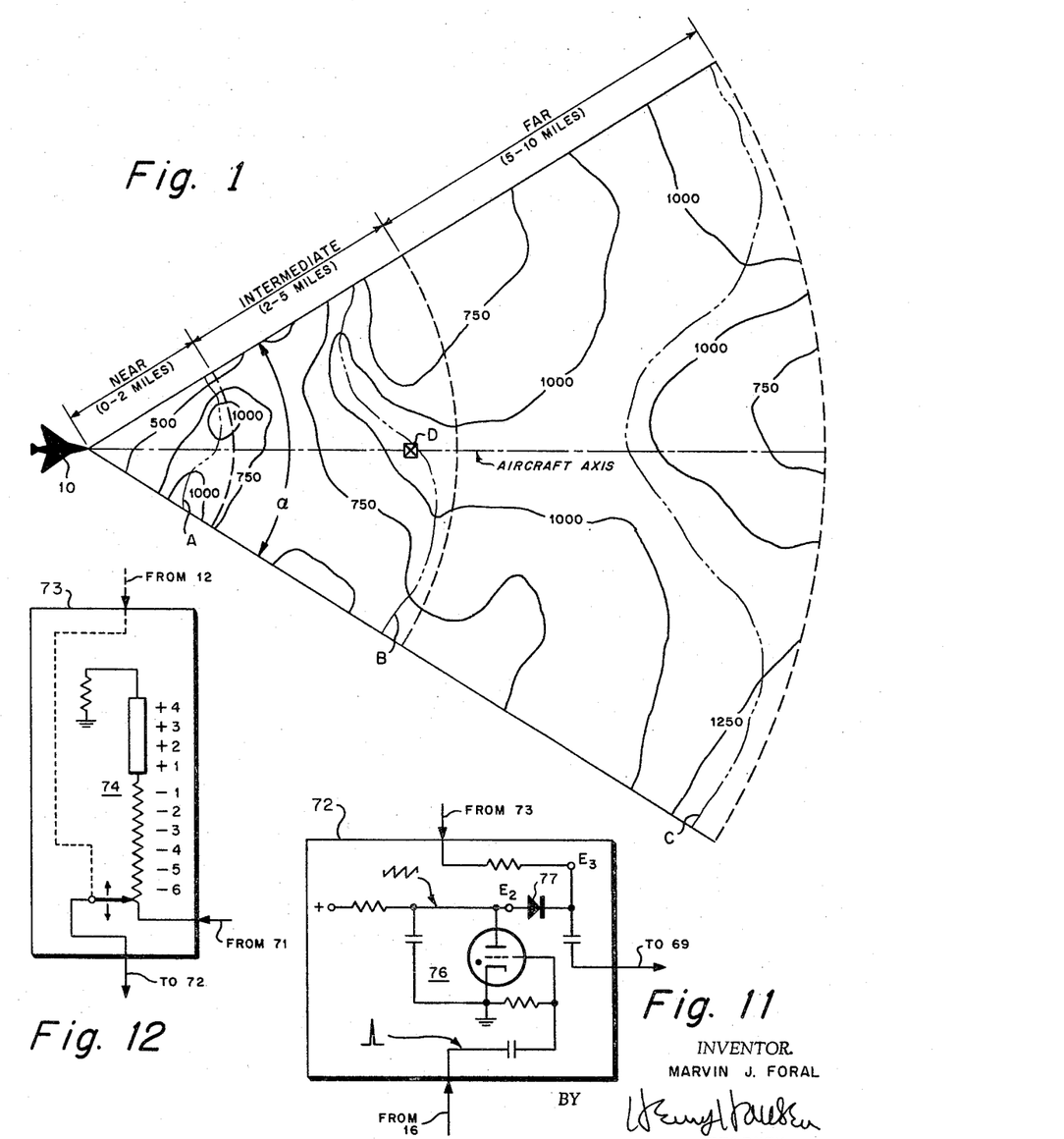
FIG. 1 represents a horizontal scan of an airborne radar antenna of the present invention over a sector of contoured terrain in which elevation contour lines have been superimposed thereon.
FIG. 11 represents a more detailed circuit diagram of a slant range adjuster as applied in FIG. 5.
FIG. 12 represents a more detailed circuit diagram of an antenna depression sensor as applied in FIG. 5.
Figure 2:
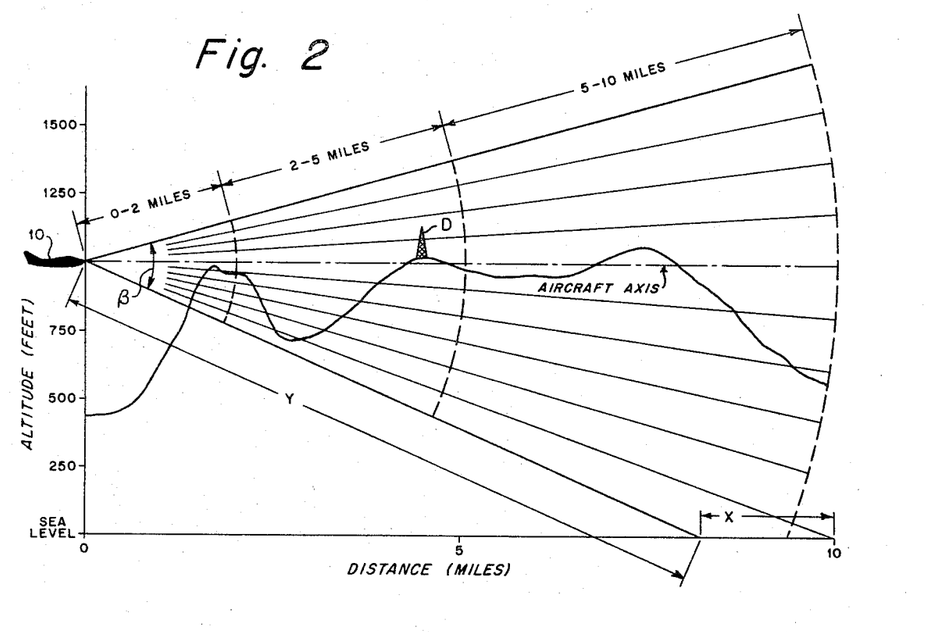
FIG. 2 represents a vertical scan of the radar antenna of FIG. 1 in which a vertical cross section through the terrain along the aircraft axis is superimposed thereon.
Figure 3:
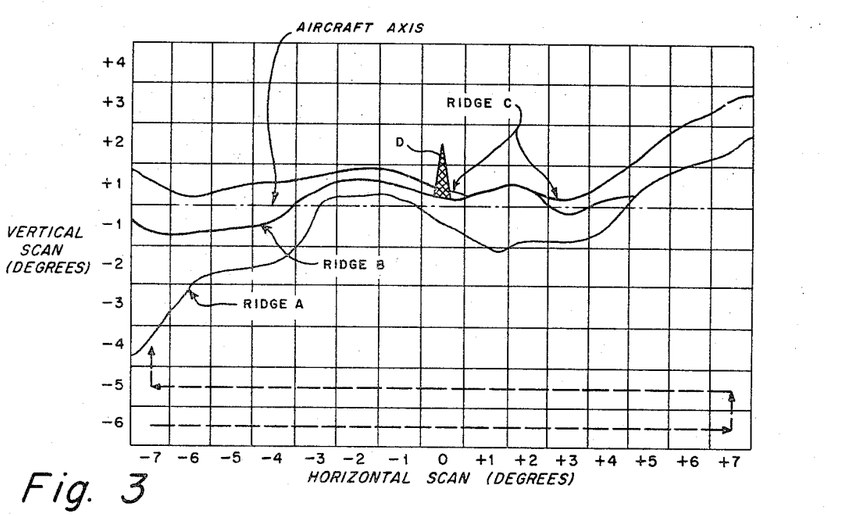
FIG. 3 represents a forward view from the radar antenna of the contoured terrain included by the horizontal and vertical scans of FIGS. 1 and 2.

In the illustrated embodiment of the invention, FIG. 1 shows an aircraft 10 flying at an altitude of 1000 feet from left to right over a sector of contoured terrain on which 500-, 750-, 1000-, and 1250-feet elevation contour lines have been superimposed. The aircraft 10 has high speed capabilities and includes a horizontally and vertically scanning antenna mounted in the front. The angle of the terrain sector is a downward projection of a viewing angle α determined by the horizontal scan of the antenna. The vertical scan of the antenna defines a viewing angle β. In the illustrated embodiment of the invention, the angle α represents a total horizontal scan of 15 degrees (7½ degrees left and right excursion from the aircraft axis), and the angle β represents a total of 10 degrees vertical scan (4 degrees above and 6 degrees below the aircraft axis). The angles α and β of FIGS. 1 and 2, respectively, are greatly exaggerated for illustration only. The radar range of interest contemplated for the inventive embodiment is 10 miles and is divided into three zones identified as Near (0 to 2 miles), Intermediate (2 to 5 miles), and Far (5 to 10 miles). Within the Near zone, the chain line identified as Ridge A represents the highest elevations of terrain and obstacles within the Near zone for each angle viewed by the antenna. Chain lines identified as Ridges B and C represent the highest elevations within the Intermediate and Far zones, respectively. A radio tower D is also shown in the Intermediate zone as a relatively small object on a projection of the aircraft axis. FIGURE 3 shows the Ridges A, B and C as viewed from the aircraft for the full field of view included within the horizontal and vertical limits of the antenna scan.

Figure 4:
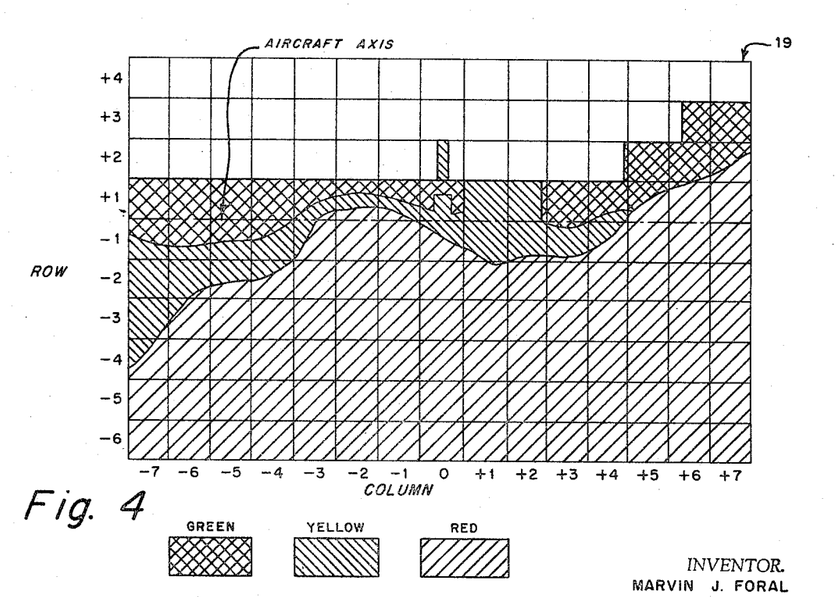
FIG. 4 represents a display of the contoured terrain of FIGS. 1, 2 and 3 as detected by the radar system of the present invention.

A postulated 15° by 10° display raster of the profiles of Ridges A, B and C, produced in accordance with the present invention, is shown in FIG. 4 wherein the area indicated as Red corresponds to the area below Ridge A, the area indicated as Yellow corresponds to the area below Ridge B not occluded by Ridge A nor radio tower D, and the area indicated as Green corresponds to the area below Ridge C not occluded by either Ridge A or B.

Figure 5:
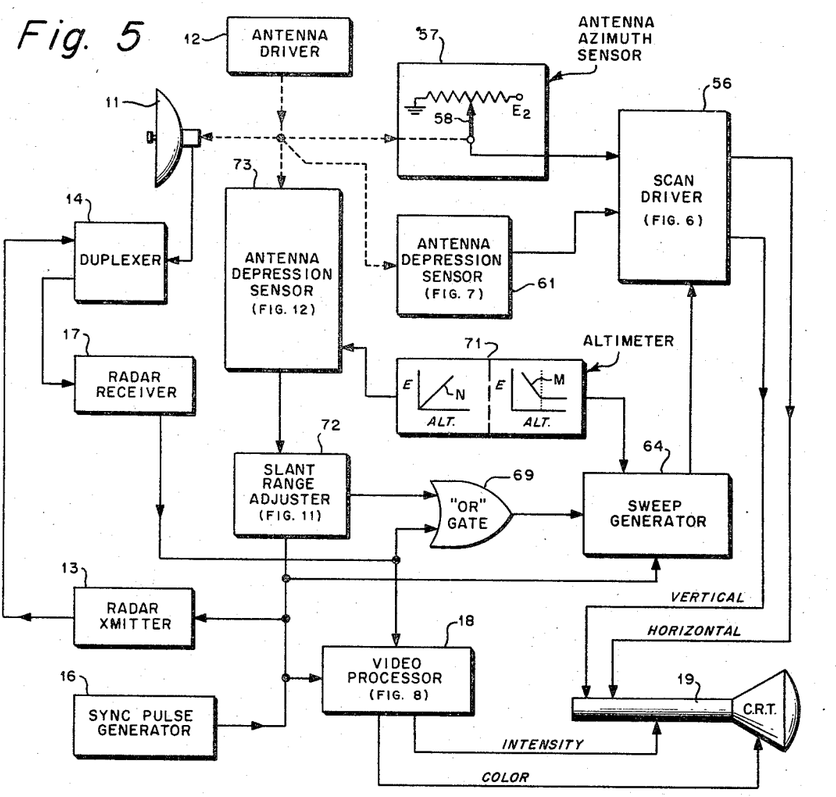
FIG. 5 is a block diagram of one embodiment of the present invention as applied to the antenna scans of FIGS. 1 and 2.

The particular manner in which the display shown in FIG. 4 is obtained will now be explained with particular reference to FIG. 5 which shows a complete block diagram of one embodiment of an airborne obstacle avoidance system. A radar antenna 11, mentioned previously as being mounted in the front of the aircraft 10, is oscillated at a constant speed by an antenna driver 12 for obtaining 15 degrees horizontal scan and 10 degrees vertical scan. A transmitter 13 produces a short radar frequency pulse through a duplexer 14 to the antenna 11 at a PRF (pulse repetition frequency) determined by a sync pulse generator 16. As will be appreciated, the display resolution will depend upon the number of beam elements making up the display raster, and the PRF per element. For the present invention, the highest permissible radar frequency is contemplated in order to produce a pencil beam in the order of one degree at three db points. For a maximum radar range of 10 miles, the time between pulses should be at least 125 microseconds. This corresponds to a PRF of 8000 p.p.s. Thus, for a 10 degree by 15 degree display raster, there are 150 beam elements; and with a contemplated PRF of 8000 p.p.s., there are 53⅓ pulses per beam element. The antenna 11 must scan horizontally forth and back in one-fifth of a second, the complete raster being scanned every second. Between transmitting pulses, the duplexer 14 permits radar frequency energy received by the antenna 11 to be connected to the input of a radar receiver 17 having a video output connected to a video processor 18 which also receives the PRF signal from the generator 16. There are two outputs from the processor 18 to a CRT (cathode ray tube) 19 which are an intensity modulation signal and a color modulation signal. It is contemplated that the tube 19 may be of any type, such as a Lawrence tube, which has a three-color face, preferably Red, Yellow and Green.

Figure 8:
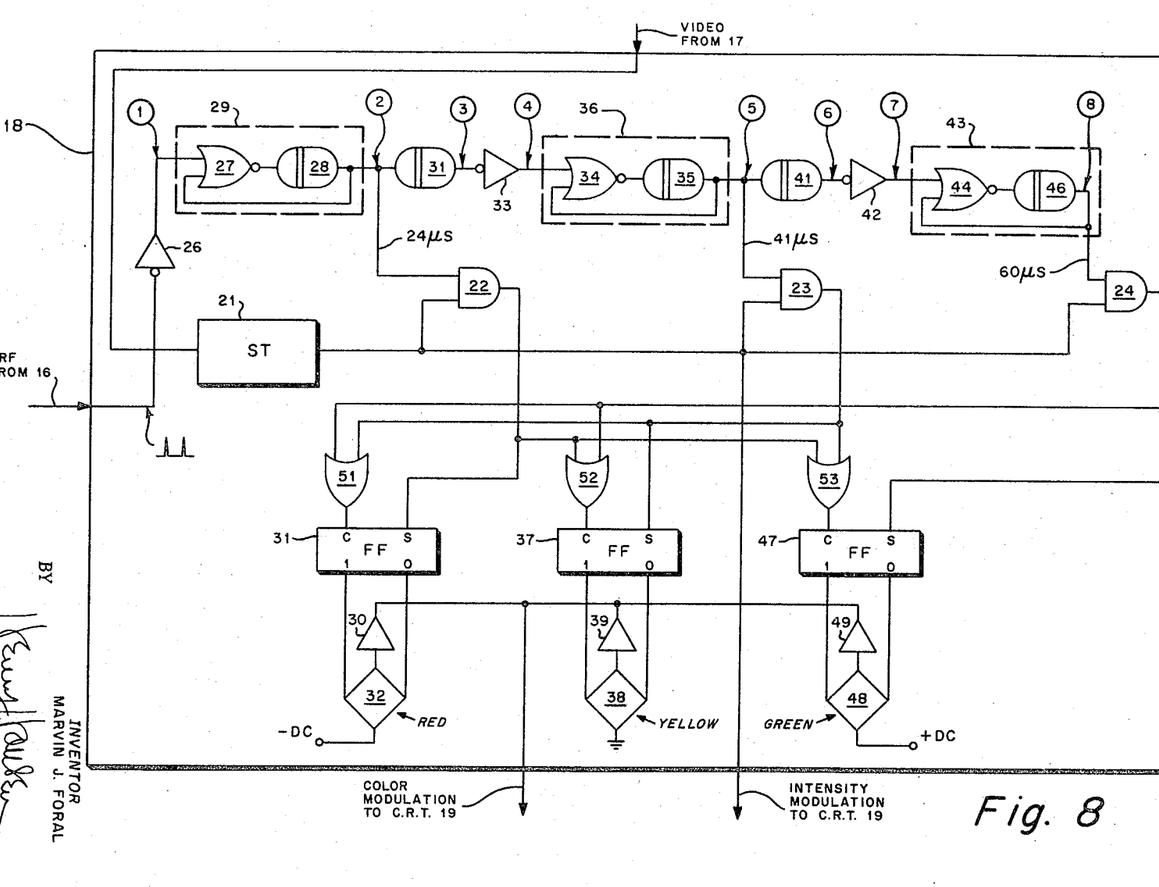
FIG. 8 represents a more detailed logic circuit diagram for a video processor as applied in FIG. 5.

The video processor 18 controls the color on the cathode ray tube 19 as a function of range from the aircraft to the object. When an object is detected, the color corresponding to a range bracket to that object will be generated on the tube 19, and the color will continue until another object in a different color range is intercepted. If there is no further video returned during the PRF cycle, only the color of the first object detected will be displayed for the remainder of the PRF cycle. Referring to the more detailed logic circut diagram of the processor 18, the video input signal is connected through a Schmitt trigger 21 to the intensity modulation output signal of the processor 18 and to one input each of "AND" gates 22, 23 and 24. The trigger 21 assures that the video signal has attained a certain "threshold" voltage.

Color control is initiated by PRF signal from the sync pulse generator 16. This pulse is illustrated in the typical timing diagram of FIG. 9 as occurring every 125 microseconds. As stated previously, this period is selected to provide a maximum radar range of 10 miles. The PRF signal is inverted, signal 1 of FIG. 9, by an amplifier 26 and then fed to one input of an "OR" gate 27 which operates to produce a "1" state at its output when both inputs are "0" state. The output of the "OR" gate 27 is fed back through a time delay 28 to the other input of the "OR" gate 27 to produce a pulse, signal 2 of FIG. 9, of duration determined by delay 28. The gate 27 and delay 28 together constitute a gate generator 29 with its output being connected to another time delay 31 and to the other input of the "AND" gate 22. In the illustrated embodiment, the pulse duration of signal 2 is 24 microseconds which corresponds to a radar range of 2 miles. If video from the trigger 21 should occur during this time, the "AND" gate 22 output will set a flip-flop 31 and thereby enable a "Red" diode gate 32. An amplifier 30, connected to the output of the diode gate 32, generates a voltage level at the color modulation output of the processor 18 which will activate "Red" in the tube 19.

Figure 9:
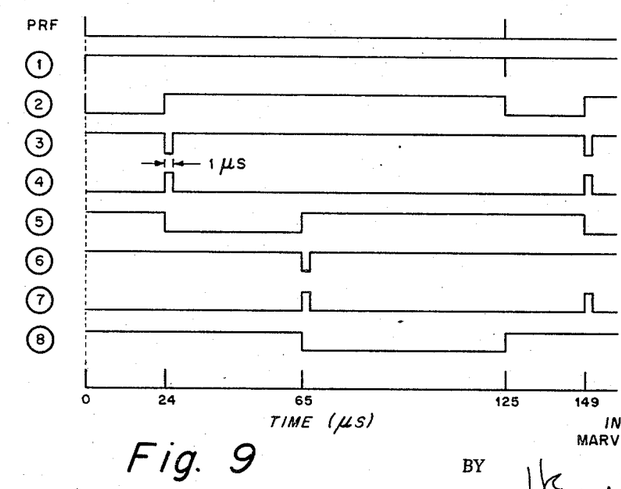
FIG. 9 represents a typical timing diagram of the video processor of FIG. 8.

The time delay 31 will produce a short pulse, such as one microsecond, signal 3 of FIG. 9, at the trailing edge of the pulse from the gate generator 29. It is inverted by an amplifier 33 and fed to one input of an "OR" gate 34. Like time delay 28, a time delay 35 forms another gate generator 36 having an output pulse of 41 microseconds, signal 5 of FIG. 9, which corresponds to a three-mile radar range. This output is connected to the other input of the "AND" gate 23 so that when a video signal from the trigger 21 occurs during the pulse from the gate generator 36, the "AND" gate 23 output sets a flip-flop 37 which will enable a "Yellow" diode gate 38. An amplifier 39 will produce a voltage at the color modulation output of the processor 18 of a level which will activate "Yellow" in the tube 19.

The output from the gate generator 36 is also connected to a time delay 41 to produce a short one microsecond pulse, signal 6 of FIG. 9, at the trailing edge of the pulse of signal 5 whereupon it is inverted by the amplifier 42, signal 7 of FIG. 9, and processed in a gate generator 43, which comprises an "OR" gate 44 and a time delay 46 operating in the same manner as described for gate generators 29 and 36 except that the duration of the pulse, signal 8 of FIG. 9, is 60 microseconds to correspond to a five-mile radar range. The gate generator 43 output is connected to the other input to the "AND" gate 24 so that when video from the trigger 21 occurs during this pulse, the output sets a flip-flop 47 thereby enabling a "Green" diode gate 48. An amplifier 49 will produce a voltage level for activating "Green" color modulation to the tube 19.

If no video is received during the pulse intervals of the gate generators 36 and 43, the "Red" presentation will continue for the entire period between sync pulses, i.e., 125 microseconds (24+41+60 μs.). If another object is intercepted during the same period, the color must change to correspond to the range of this other object. This is accomplished by further connecting the outputs from "AND" gates 22, 23 and 24 to selected inputs of "OR" gates 51, 52 and 53, and connecting the latter to the "clearing" inputs of the flip-flops 31, 37 and 47, respectively, whereby a signal from the "AND" gate 23 will clear the flip-flop 31, and a signal from the "AND" gate 24 will clear both of the flip-flops 31 and 37.

Figures 6, 7:
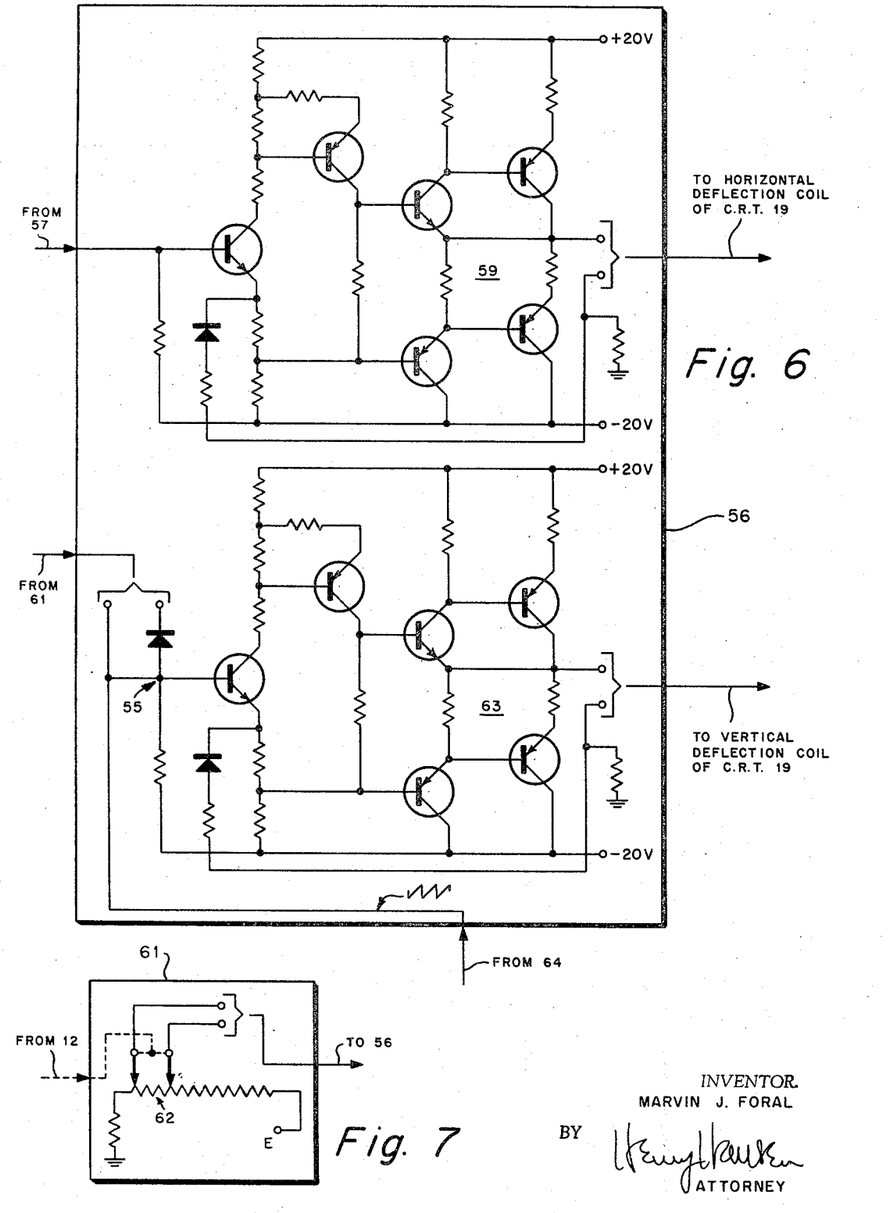
FIG. 6 represents a more detailed circuit diagram of a sweep driver circuit as applied in FIG. 5.
FIG. 7 represents a more detailed circuit diagram of an antenna depression sensor as applied in FIG. 5.

Antenna position information is supplied to the cathode ray tube 19 from a scan driver 56 which has two outputs respectively connected to the vertical and horizontal deflection coils of the tube 19. The driver 56 also includes three inputs, one receiving antenna azimuth position from an antenna azimuth sensor 57 in the form of a voltage off a potentiometer 58 whose armature is mechanically positioned in accordance with the horizontal scan position of the antenna 11. A conventional driver circuit such as circuit 59 of FIG. 6 is contemplated for translating the antenna azimuth input signal to a horizontal deflection voltage suitable for operating in the tube 19. The second-mentioned input to the scan driver 56 is received from an antenna depression sensor 61. Referring to the more detailed illustration of FIG. 7, the sensor 61 is shown as comprising a dual armature potentiometer 62 in which two voltage levels, of constant differential, are produced and vary with the antenna depression angle. The armatures are concomitantly positioned in accordance with the vertical scan position of the antenna 11. The sensor 61 voltages are fed to another conventional drive circuit such as circuit 63 for producing a vertical deflection voltage suitable for operating in the tube 19.

Figure 10:
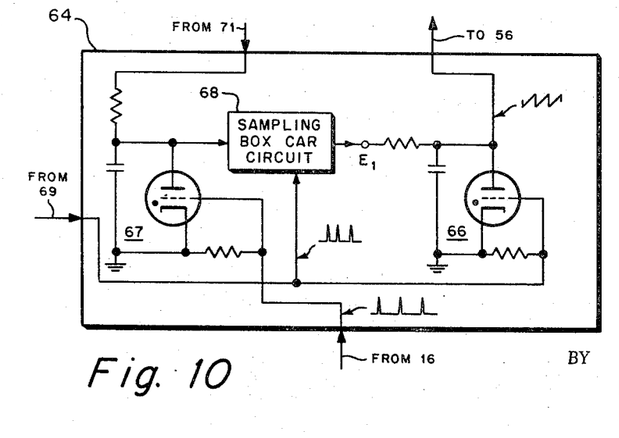
FIG. 10 represents a more detailed circuit diagram of a sweep generator as applied in FIG. 5.

With the scan driver 56 as described hereinabove, it should now be apparent that a plurality of horizontal lines will be traced across the tube 19, the number of lines depending upon the number of horizontal scans (left or right) of the antenna 11 in each vertical antenna scan. As seen in FIGS. 2 and 4, there are 10 horizontal scans (6 below and 4 above the aircraft axis). The third-mentioned input to the scan driver 56 is received from a sweep generator 64 which produces a short vertical sweep in the tube 19 for a distance equal to the spacing between the aforementioned horizontal lines and at the PRF (pulse repetition frequency), i.e. the antenna depression input signal to the scan driver 56 is superimposed at a junction 55 (FIG. 6) by a vertical sweep voltage during each 125 microsecond cycle. Referring now to the details of the sweep generator 64, FIG. 10, two sawtooth generators indicated generally by the numerals 66 and 67 are operatively connected in a manner described hereinbelow to a sampling circuit 68 which may be a conventional "boxcar" circuit well-known in the art. If the voltage input at $E_1$ to the sawtooth generator 66 is constant, a sawtooth voltage of uniform amplitude will be generated each time a pulse appears at a trigger pulse input of the sweep generator 64. This sawtooth voltage is connected to the junction 55 in the scan driver 56.

If the trigger pulse to the sawtooth generator 66, contrary to the inventive concepts, is maintained coincident with the PRF from the sync pulse generator 16, the sweep voltage modifying the antenna depression sensor output voltage would encompass a radar range from 0 to 10 miles irrespective of aircraft altitude and antenna depression angle. Consequently, at low altitudes and large downward depression angles of the antenna, small obstacles in the Near zone (0 to 2 miles) would appear on the display as imperceptible "Red" pips in a subdued background of Intermediate zone of "Yellow" (2 to 5 miles) and Far zone (5 to 10 miles) of "Green." For example, the tower D would be a hardly perceptible "Yellow" pip. The present invention provides means for accentuating such small objects to approximate real world images by modifying the sweep voltage to the scan driver 56 as a function of altitude of the aircraft and depression angle of the antenna 11 for all of the radar range zones. As can be seen in FIG. 2, for a constant radar beam angle, the horizontal distance X at sea level and the slant range Y from the aircraft 10 to sea level will vary with aircraft altitude and antenna depression angle. That is, as altitude decreases or as the antenna depression angle below the aircraft axis increases, X and Y will decrease.

To approximate the real world viewed in FIG. 3, it is therefore contemplated that the vertical sweep between horizontal scan lines represent a range equal to the distance X and begin after a time interval from the sync pulse equal to the slant range Y. This is accomplished in the illustrated embodiment by modifying the voltage $E_1$ in the sweep generator 64. The sawtooth generator 67 receives its starting pulse from the sync pulse generator 16 and its reference voltage from an output M of an altimeter 71 (FIG. 5). This voltage varies linearly and inversely with altitude up to 5000 feet, above which the voltage remains constant. This is because, above 5000 feet, it is desired that the vertical sweep represent a 5 to 10 mile radar range. Thus, the slope of the sawtooth wave generated at the output of the generator 67 will be a function of altitude and is operatively connected to the sample voltage input of the sampling circuit 68. An input trigger pulse for sampling comes from the "OR" circuit 69, and the output voltage of the circuit 68 is connected as the input voltage $E_1$ of the sawtooth generator 66. It should now be apparent that the voltage $E_1$ will vary (1) as the aircraft altitude, and (2) as the time interval between the input trigger pulse and the input sync pulse. Thus, the trigger pulse input determines when the vertical sweep will begin after the sync pulse and this interval is a function of aircraft altitude and the antenna depression angle.

The trigger pulse input to the "OR" gate 69 is generated in a slant range adjuster 72 which receives a sync pulse input from the sync pulse generator 16 and another input from an antenna depression sensor 73. As shown in more detail in FIG. 12, the antenna depression sensor 73 includes a modified potentiometer 74 whose armature is positioned in accordance with the vertical scan position of the antenna 11. The armature moves across a resistor connected in series with a contact bar with the resistance terminal being connected to another reference voltage from an output N of the altimeter 71, and with the contact bar terminal being connected through a fixed resistor to ground. In contradistinction to the output M of the altimeter 71, the output N produces a voltage which varies directly and linearly with aircraft altitude. The output from the depression sensor 73 is taken from the armature of the potentiometer 74 and constitutes an altitude-modified antenna depression angle voltage to the slant range adjuster 72.

Referring now to FIG. 11 where the slant range adjuster 72 is shown in more detail, a sawtooth generator indicated generally by the numeral 76 is shown receiving a sync pulse from the sync pulse generator 16 and a reference voltage $E_2$ for generating a constant amplitude, constant frequency sawtooth wave $E_2$ at the input to a diode 77. The altitude-depression voltage identified as $E_3$ from the sensor 73 is connected to the output of the diode 77. When voltage $E_2$ exceeds the voltage $E_3$, a voltage appears at the output of the adjuster 72 as a trigger pulse at some interval after the input sync pulse. The time interval is a function of the magnitude of the altitude-depression voltage $E_3$.

In the event that a return radar signal is received before the trigger pulse, indicating an object nearer than the range corresponding to the start of the normal sweep, an electrical connection is provided from the video output of the radar receiver 17 to the other input of the "OR" gate 69 so that either a pulse from the slant range adjuster 72 or from the video will produce a trigger pulse to the sweep generator 64 to start the vertical sweep.

While the sweep voltage is modified in accordance with altitude and antenna depression angle for accentuating small objects to approximate real world images, it is contemplated that further accentuation may be obtained by adding a pulse stretching means of conventional design to the intensity modulation output of the video processor 18 prior to feeding it to the tube 19.

*Operation*

The operation of the invention as applied to the illustrated embodiment will now be summarized for a low altitude, high speed mission of the aircraft 10 over the contoured terrain illustrated in FIGS. 1, 2 and 3. A complete display raster begins when the radar beam is at $-6°$ vertical scan and $-7°$ horizontal scan (FIG. 3). Ideally, the beam should traverse horizontally and to the right at a constant speed to $+7°$ horizontal scan, then vertically to $-5°$ vertical scan, then return to the left on a horizontal scan to $-7°$ horizontal scan, and then shift upward to $-4°$ vertical scan, as shown by the dash-line arrows. At this last position, the scanning cycle is repeated four more times to complete the raster. In practice, however, the antenna 11 will produce a zig-zag raster from bottom to top, the raster being completed in one second. The next raster develops from top to bottom.

During the horizontal scan at the vertical scan position of $-6°$, the horizontal distance X (FIG. 2) is about 1900 feet, and the slant range Y is about 8500 feet. These values dictate the time delay after each sync pulse before the start of the vertical sweep unless there is an earlier interception of an obstacle by the radar beam. Electrically, this is accomplished by the altimeter 71 feeding the output N voltage for 1000 feet to the antenna depression sensor 73 where it is combined with the antenna depression angle for $-6°$ A sync pulse from the sync pulse generator 16 combines with the sensor 73 output in the slant range adjuster 72 to produce a trigger pulse to one input of the "OR" gate 69. The other input to the "OR" gate obtains from the video output of the radar receiver 17. If no obstacle is intercepted before 8500 feet, the trigger pulse would initiate start of the PRF vertical sweep from the sweep generator 64. This PRF sweep must terminate at the next sync pulse, and this is accomplished by altering the sawtooth wave slope from the sweep generator 64 by means of the output M from the altimeter 71. The PRF sweep voltage is superimposed on the scan driver input from the vertical antenna position information and together with the horizontal antenna information produce a wide horizontal scan across the raster of the tube 19.

As shown in FIG. 3, an obstacle is in fact intercepted on all beam elements of the −6° and −5° vertical scan positions. The obstacles being in the Near zone, will cause a return video signal within 24 microseconds after each sync pulse, and under this condition the "Red" diode gate 32 of the video processor 18 will cause the entire PRF sweep to appear Red on the tube 19 as shown in FIG. 4. At a −4° vertical scan and −7° horizontal scan position of the antenna, Ridge A appears in FIG. 3 with a background of obstacles in the Intermediate zone. The radar receiver 17 video or the trigger pulse from the adjuster 72 starts the vertical sweep through the "OR" gate 69. All video returned within the first 24 microseconds after the sync pulse, will enable the "Red" diode gate 32 of the processor 18 and thereby produce a Red vertical sweep in the tube 19 (FIG. 4). Video is also received between 24 and 41 microseconds after the sync pulse (the Intermediate zone) and will thereby energize the "Yellow" diode gate 38 of the processor 18 to the exclusion of the "Red" diode gate 32 and the sweep will turn to Yellow in the tube 19. There being no obstacles detected in the Far zone, the raster will appear substantially as shown in FIG. 4 at row −4, column −7. This process will continue for subsequent raster elements.

Where the three range zones occur in a single radar beam, such as at +1° vertical scan and −2° horizontal scan (FIG. 3), three colors will appear in the corresponding raster position as shown in FIG. 4. Relatively small objects, such as the radio tower D in FIG. 3, shown in the Intermediate zone at horizontal scan position 0° and extending through two vertical scan positions of +1 and +2 degrees, will appear as shown in FIG. 4 in rows 1 and 2 of column 0.

Some of the many attendant advantages of the invention as described hereinabove should now be apparent. For example, a quasi-real world display containing small objects is formed on the cathode ray tube 19 giving information of azimuth, elevation and range of contoured terrain and other obstacles. Azimuth and elevation are respectively indicated by the columns and rows in the display raster, and range is indicated in a plurality of discrete colors. While the illustrated embodiment utilizes three colors for three range zones between 0 and 10 miles, it is contemplated that fewer or more zones are possible with other discrete colors. The quasi-real world display concept is synthesized by compensating for aircraft altitude and antenna depression angle, and small object accentuation derives from the manner in which this compensation is combined with color selection. Combining real world display characteristics with object accentuation, produces an easily understood display to the pilot upon which he may rely for maneuvering his aircraft particularly at low altitudes and high speeds over unfamiliar terrain.

It will be understood, of course, that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An obstacle avoidance system for arcraft, comprising:

radar antenna means adapted to vertically and horizontally scan a solid angle in front of the aircraft for radiating and receiving radar signals, and including means for generating signals indicative of the instantaneous azimuth and depression scan angles;
 radar transmitter-receiver means operatively connected to said antenna means for generating and detecting the radar signals, the detected radar signal being the signal reflected from obstacles within said solid angle;
 video processor means operatively connected to said transmitter-receiver means for receiving the detected radar signals and producing intensity and color modulation signals as a function of signal strength and range, respectively;
 altimeter means having one output signal which varies directly with altitude, and another output signal which varies inversely with altitude and then is constant above a predetermined altitude;
 deflection means operatively connected to said antenna means and said altimeter means for receiving said scan angle signals and said altitude signals, respectively, and producing vertical and horizontal deflection signals synchronous with the scanning of the antenna means; and
 multi-color cathode ray tube means connected to said processor means and said deflection means for receiving said intensity and color modulation signals and said deflection signals, respectively, for display;
 whereby contoured terrain and other obstacles are presented as a quasi real world display in the aircraft.

2. An obstacle avoidance system as set forth in claim 1, further comprising:
 means included in said radar antenna means and said radar-transmitter receiver means for generating a high frequency radar pulse as a pencil beam capable of progressively viewing the entire solid angle scanned by said antenna means.

3. A system as set forth in claim 2 wherein said transmitter-receiver means further comprises:
 a sync pulse generator for producing sync pulses at a repetition frequency inversely proportional to the selected maximum radar range;
 a transmitter connected to said generator for receiving said pulses and generating a radar signal;
 a duplexer connected between said antenna means and said transmitter for selectably passing said transmitter radar signal; and
 a receiver connected between said duplexer and said processor for selectively passing said received radar signal.

4. A system as set forth in claim 3 wherein said video processor means further comprises:
 gating means for producing discrete signals of color modulation as a function of time after each sync pulse from said generator.

5. A system as set forth in claim 4 wherein said deflection means further comprises:
 scan driver means connected to said antenna means for receiving said azimuth and depression signals for producing the vertical and horizontal deflection signals; and
 sweep generating means operatively connected to said altimeter means for receiving said altitude signals, and connected at its output to said scan driver means for modifying said vertical deflection signal with a vertical sweep signal.

6. A system as set forth in claim 5 wherein said sweep generating means further comprises:
 first range adjusting means connected to said antenna means for receiving the depression angle signal for modifying the vertical sweep signal as a function of antenna depression angle.

7. A system as set forth in claim 5 wherein said sweep generating means further comprises:
 range adjusting means operatively connected to said altimeter means for receiving said other altitude signal for modifying the vertical sweep signal as a function of altitude.

8. A system as set forth in claim 6 wherein said sweep generating means further comprises:
 second range adjusting means operatively connected to said altimeter means for receiving said one altitude signal for modifying the vertical sweep signal as a function of altitude.

9. A system as set forth in claim 5 wherein said sweep generating means further comprises:

intercepting means operatively connected to said transmitter receiver means for receiving said received radar signal and for modifying said vertical sweep signal in accordance with the range to a detected obstacle.

10. An obstacle avoidance system as set forth in claim 8 wherein said sweep generating means further comprises:
interception means operatively connected to said transmitter-receiver means for receiving said sync pulse and for disabling said first and second range adjusting means and for modifying the vertical sweep signal in accordance with range to a detected obstacle.

11. An obstacle avoidance system for aircraft, comprising:
radar antenna means adapted to vertically and horizontally scan a solid angle in front of the aircraft for radiating and receiving radar signals, and including means for generating signals indicative of the instantaneous azimuth and depression scan angles;
radar transmitter-receiver means operatively connected to said antenna means for generating and detecting the radar signals, the detected radar signals being the signal reflected from obstacles within said solid angle;
video processor means operatively connected to said transmitter-receiver means for receiving the detected radar signals and producing intensity and color modulation signals as a function of signal strength and range, respectively;
altimeter means having an output signal which varies inversely with altitude;
deflection means operatively connected to said antenna means and said altimeter means for receiving said scan angle signals and said altitude signal, respectively, and producing vertical and horizontal deflection signals synchronous with the scanning of the antenna means; and
multi-color cathode ray tube means connected to said processor means and said deflection means for receiving said intensity and color modulation signals and said deflection signals, respectively, for display; whereby contoured terrain and other obstacles are presented as a quasi real world display in the aircraft.

References Cited

UNITED STATES PATENTS 3,134,975  5/1964  Goodman.
3,213,447  10/1965  Burrows et al.

RODNEY D. BENNETT, *Primary Examiner.*

LEWIS H. MYERS, *Examiner.*

P. M. HINDERSTEIN, D. C. KAUFMAN,
*Assistant Examiners.*